US012766621B2

(12) United States Patent
Takeuchi et al.

(10) Patent No.: US 12,766,621 B2
(45) Date of Patent: Oct. 20, 2026

(54) CONTROL DEVICE, NON-TRANSITORY COMPUTER-READABLE STORAGE MEDIUM, AND CONTROL METHOD

(71) Applicant: HAKKO CORPORATION, Osaka (JP)

(72) Inventors: Hitoshi Takeuchi, Osaka (JP); Mitsuhiko Miyazaki, Osaka (JP); Kenji Matsuzaki, Osaka (JP); Kenta Nakamura, Osaka (JP); Yoshitomo Teraoka, Osaka (JP)

(73) Assignee: HAKKO CORPORATION, Osaka (JP)

( * ) Notice: Subject to any disclaimer, the term of this patent is extended or adjusted under 35 U.S.C. 154(b) by 800 days.

(21) Appl. No.: 18/333,426

(22) Filed: Jun. 12, 2023

(65) Prior Publication Data

US 2023/0405700 A1 Dec. 21, 2023

Related U.S. Application Data

(60) Provisional application No. 63/351,585, filed on Jun. 13, 2022.

(30) Foreign Application Priority Data

Apr. 17, 2023 (JP) ................................ 2023-067103

(51) Int. Cl.
*B23K 3/03* (2006.01)

(52) U.S. Cl.
CPC .................................... *B23K 3/033* (2013.01)

(58) Field of Classification Search
CPC ...................................................... B23K 3/033
See application file for complete search history.

(56) References Cited

U.S. PATENT DOCUMENTS

| | | | | | |
|---|---|---|---|---|---|
| 4,935,600 | A * | 6/1990 | Pachschwoll | B23K 3/033 | 219/241 |
| 5,021,634 | A * | 6/1991 | Santoro | B23K 3/033 | 219/505 |
| 5,504,305 | A * | 4/1996 | Fischer | B23K 1/012 | 219/85.1 |

(Continued)

FOREIGN PATENT DOCUMENTS

JP 2001-062562 A 3/2001

*Primary Examiner* — Thomas E Lazo
(74) *Attorney, Agent, or Firm* — PROCOPIO, CORY, HARGREAVES & SAVITCH LLP

(57) ABSTRACT

A control device includes an acquisition portion which acquires a detection value of a temperature detected by a detecting member, a specifying portion which specifies a temperature change trend of a solder processing portion based on history information of a detection value acquired by the acquisition portion, a setting portion which sets a number of heat pulse to be applied to a heating portion by correcting a reference value using a correction value, a control portion which controls the application of the heat pulses to the heating portion based on a setting result of the number of heat pulse by the setting portion, a storage portion which stores the history information. The setting portion sets the correction value using correction information which is different according to whether the temperature change trend is a temperature rising trend or a temperature declining trend.

15 Claims, 16 Drawing Sheets

(56) References Cited

U.S. PATENT DOCUMENTS

| | | | | |
|---|---|---|---|---|
| 6,329,641 | B1 * | 12/2001 | Miyazaki | B23K 3/033<br>219/497 |
| 10,645,817 | B1 * | 5/2020 | Nguyen | B23K 1/0016 |
| 11,376,683 | B2 * | 7/2022 | Mittmann | B23K 35/00 |

* cited by examiner

FIG. 5

```
{  0,  6,  6,  6,  6,  7,  9, 11, 14, 17,     //  0~9℃
  20, 22, 23, 25, 27, 28, 29, 29, 29, 29,     //  10~19℃
  29, 29, 29, 29, 29, 29, 29, 29, 29, 29,     //  20~29℃
  29, 29, 29, 29, 29, 29, 29, 29, 29, 29,     //  30~39℃
};
```

* WHEN THE TEMPERATURE DIFFERENCE IS OVER 39 DEGREES CENTIGRADE, THE NUMBER OF REFERENCE PULSE = 29

FIG. 6

```
{  0,  2,  2,  3,  3,  4,  4,  5,  6,  7,          //  0~9℃
   8, 10, 12, 15, 18, 21, 25, 29, 29, 29,          //  10~19℃
  29, 29, 29, 29, 29, 29, 29, 29, 29, 29,          //  20~29℃
  29, 29, 29, 29, 29, 29, 29, 29, 29, 29,          //  30~39℃
};
```

* WHEN THE TEMPERATURE CHANGE (DECLINING) IS OVER 39 DEGREES CENTIGRADE, THE NUMBER OF ADDITION PULSE =29

FIG. 7

```
{ 0,  1,  1,  2,  2,  3,  3,  4,  4,  5,      //  0~9°C
  5,  6,  6,  7,  8,  9, 10, 11, 12, 13,      //  10~19°C
 14, 15, 16, 17, 18, 20, 22, 24, 26, 28,      //  20~29°C
 29, 29, 29, 29, 29, 29, 29, 29, 29, 29,      //  30~39°C
};
```

*WHEN THE TEMPERATURE CHANGE (RISING) IS OVER 39 DEGREES CENTIGRADE,
THE NUMBER OF SUBTRACTION PULSE =29

FIG. 9

| | |
|---|---|
| CONDITION 1: TEMPERATURE MAINTAINING TREND ΔT=0 | $P = P0$ |
| CONDITION 1: TEMPERATURE RISING TREND ΔT>0 | $P = P0-(P^{-})$ |
| CONDITION 1: TEMPERATURE DECLINING TREND ΔT<0 | $P = P0+(P^{+})$ |

FIG. 10

| WHILE TEMPERATURE IS DROPPING: SET TEMPERATURE 350 DEGREES CENTIGRADE | | | |
|---|---|---|---|
| TIME (CONTROL CYCLE) | SENSOR TEMPERATURE | (CONVENTIONAL) NUMBER OF PULSE SET ACCORDING TO THE DIFFERENCE BETWEEN SET TEMPERATURE | (INVENTION) NUMBER OF PULSE CALCULATED BY TEMPERATURE CHANGE AMOUNT |
| 1 | 347 | 6 | 6 |
| 2 | 350 | 0 | 0 |
| 3 | 348 | 6 | 6 |
| 4 | 347 | 6 | 7 |
| 5 | 346 | 6 | 8 |
| 6 | 347 | 6 | 7 |
| 7 | 344 | 9 | 11 |
| 8 | 346 | 6 | 10 |

FIG. 11

| WHILE TEMPERATURE IS RISING: SET TEMPERATURE 300 DEGREES CENTIGRADE | | | |
|---|---|---|---|
| TIME (CONTROL CYCLE) | SENSOR TEMPERATURE | (CONVENTIONAL) NUMBER OF PULSE SET ACCORDING TO THE DIFFERENCE BETWEEN SET TEMPERATURE | (INVENTION) NUMBER OF PULSE CALCULATED BY TEMPERATURE CHANGE AMOUNT |
| 1 | 278 | 29 | 29 |
| 2 | 278 | 29 | 29 |
| 3 | 282 | 29 | 29 |
| 4 | 282 | 29 | 29 |
| 5 | 286 | 27 | 26 |
| 6 | 287 | 25 | 24 |
| 7 | 289 | 22 | 20 |
| 8 | 290 | 20 | 15 |
| 9 | 290 | 20 | 15 |

FIG. 12

| CONDITION 1: TEMPERATURE MAINTAINING TREND ΔT=0 |
| --- |
| P=P0 |

| CONDITION 1: TEMPERATURE RISING TREND ΔT>0 | | |
| --- | --- | --- |
| CONDITION 2: ΔTupP−ΔTup<0 | CONDITION 2: ΔTupP−ΔTup>0 | CONDITION 2: ΔTupP−ΔTup=0 |
| P=P0−(P⁻) | P=P0+(P⁺) | P=P0 |

| CONDITION 1: TEMPERATURE DECLINING TREND ΔT<0 | | |
| --- | --- | --- |
| CONDITION 2: ΔTdownP−ΔTdown<0 | CONDITION 2: ΔTdownP−ΔTdown>0 | CONDITION 2: ΔTdownP−ΔTdown=0 |
| P=P0+(P⁺) | P=P0−(P⁻) | P=P0 |

FIG. 13

| CONDITION 1: TEMPERATURE RISING TREND Ta>0 | | |
|---|---|---|
| | CONDITION 2 Tb>0 | CONDITION 2 Tb≦0 |
| CONDITION 3 Tc≧0 | $P=P0-(Pa^{-}+Pb^{-})$ | $P=P0-Pa^{-}$ |
| CONDITION 3 Tc<0 | | $P=P0$ |

| CONDITION 1: TEMPERATURE DECLINING TREND Ta<0 | | |
|---|---|---|
| | CONDITION 2 Tb<0 | CONDITION 2 Tb≧0 |
| CONDITION 3 Tc≦0 | $P=P0+(Pa^{+}+Pb^{+})$ | $P=P0+Pa^{+}$ |
| CONDITION 3 Tc>0 | | $P=P0$ |

| CONDITION 1: TEMPERATURE MAINTAINING TREND Ta=0 |
|---|
| $P=P0$ |

FIG. 15

| WHILE TEMPERATURE IS DROPPING: SET TEMPERATURE 350 DEGREES CENTIGRADE | | | |
|---|---|---|---|
| TIME (CONTROL CYCLE) | SENSOR TEMPERATURE | (CONVENTIONAL) NUMBER OF PULSE SET ACCORDING TO THE DIFFERENCE BETWEEN SET TEMPERATURE | (INVENTION) NUMBER OF PULSE CALCULATED BY TEMPERATURE CHANGE AMOUNT |
| 1 | 347 | 6 | 3 |
| 2 | 350 | 0 | 0 |
| 3 | 348 | 6 | 0 |
| 4 | 347 | 6 | 5 |
| 5 | 346 | 6 | 9 |
| 6 | 347 | 6 | 7 |
| 7 | 344 | 9 | 10 |
| 8 | 346 | 6 | 10 |

FIG. 16

| WHILE TEMPERATURE IS RISING: SET TEMPERATURE 300 DEGREES CENTIGRADE | | | |
|---|---|---|---|
| TIME (CONTROL CYCLE) | SENSOR TEMPERATURE | (CONVENTIONAL) NUMBER OF PULSE SET ACCORDING TO THE DIFFERENCE BETWEEN SET TEMPERATURE | (INVENTION) NUMBER OF PULSE CALCULATED BY TEMPERATURE CHANGE AMOUNT |
| 1 | 278 | 29 | 29 |
| 2 | 278 | 29 | 29 |
| 3 | 282 | 29 | 25 |
| 4 | 282 | 29 | 25 |
| 5 | 286 | 27 | 21 |
| 6 | 287 | 25 | 15 |
| 7 | 289 | 22 | 10 |
| 8 | 290 | 20 | 5 |
| 9 | 290 | 20 | 5 |

CONTROL DEVICE, NON-TRANSITORY COMPUTER-READABLE STORAGE MEDIUM, AND CONTROL METHOD

CROSS-REFERENCE TO RELATED APPLICATIONS

This application claims priority from U.S. Provisional Patent Application 63/351,585 filed on Jun. 13, 2022 and Japanese Patent Application No. 2023-067103 filed on Apr. 17, 2023, the entire subject-matters of which are incorporated herein by reference.

TECHNICAL FIELD

The present disclosure relates to a control device for controlling a solder processing device, a non-transitory computer-readable storage medium storing a program, and a control method to control the solder processing device.

BACKGROUND ART

A temperature control device for a soldering iron in the art is disclosed in JP2001-062562A. The temperature control device includes a heat pulse generating section that generates heat pulse, a heating section that receives the heat pulse to heat the soldering tip and outputs sensor signal corresponding to the temperature of the soldering tip, and a controller for controlling the temperature of the soldering tip by applying variable number of heat pulses to the heating section. The controller converts the sensor signal from the heating section into measured temperature data, and determines the variable number of heat pulses in a non-linear relationship based on the temperature difference between the measured temperature data and the set temperature.

According to the temperature control device disclosed in JP2001-062562A, an excessive overshoot may occur when the soldering tip temperature recovers from a temperature lower than the set temperature to the set temperature after completing the soldering work.

FIG. 1 shows temperature transitions of a soldering tip and a workpiece when soldering. In this example, the set temperature of the soldering tip is 400° C. When the soldering tip contacts with the workpiece to perform soldering, the tip temperature drops and the work temperature rises. As the soldering tip leaves the work and moves to the next work, the tip temperature increases and the work temperature decreases. The tip temperature is about 300° C. at the time when soldering to the final work is completed which is lower than the set temperature, and the controller sets a large value as the variable number of heat pulses based on the temperature difference from the set temperature. Since there is no next work for the last work, the temperature of the soldering tip rises sharply due to excess supply of heat pulses. As a result, as indicated by the chain double-dashed line in FIG. 1, the temperature continues to rise for a while even after the tip temperature exceeds the set temperature of 400° C., causing excess overshooting.

On the other hand, it is possible to suppress overshooting by setting the variable number of heat pulses smaller throughout the control. However, in such control, the number of heat pulses to raise the dropped tip temperature when the soldering tip is in contact with the workpiece is also reduced. Therefore, the performance of the soldering iron is degraded.

SUMMARY OF INVENTION

An object of the present disclosure is to provide a control device, a non-transitory computer-readable storage medium storing a program, and a control method, which can suppress overshooting without degrading the performance of a solder processing device.

According to a first aspect of the disclosure, there is provided a control device configured to control a solder processing device having a solder processing portion which processes solder, a heating portion which heats said solder processing portion by applying heat pulses, and a detecting member which detects the temperature of said solder processing portion. The control device includes an acquisition portion which acquires a detection value of the temperature detected by said detecting member, a specifying portion which specifies a temperature change trend of said solder processing portion based on history information of said detection value acquired by said acquisition portion, a setting portion which sets the number of heat pulse to be applied to said heating portion by correcting a reference value using a correction value, a control portion which controls the application of said heat pulses to said heating portion based on a setting result of said number of heat pulse by said setting portion, and a storage portion which stores said history information. The setting portion sets said correction value using correction information which is different according to whether said temperature change trend is a temperature rising trend or a temperature declining trend.

According to this aspect, the setting portion sets the correction value using the correction information which is different according to whether the temperature change trend is a temperature rising trend or a temperature declining trend. Therefore, even if the temperature difference between the set temperature of the solder processing portion and the detection value is the same, different number of heat pulse can be set using a correction value which is different according to whether it is a temperature rising trend or it is a temperature declining trend, so an optimum value can be set according to the property of each trend. As a result, it is possible to suppress overshooting at temperature rising trend without degrading the performance of the solder processing device at temperature declining trend.

In the above aspect, said correction information may include an addition table indicating an addition value to be added to said reference value and a subtraction table indicating a subtraction value to be subtracted from said reference value stored in said storage portion, and said correction value may be said addition value indicated by said addition table or said subtraction value indicated by said subtraction table, and said setting portion may set said number of heat pulse according to said temperature change trend, based on said reference value, a value obtained by adding said addition value to said reference value, or a value obtained by subtracting said subtraction value from said reference value.

According to this aspect, the setting portion can set an appropriate number of heat pulse depending on the temperature change trend by referring to the addition table and the subtraction table stored in the storage portion.

In the above aspect, said addition table and said subtraction table referred to when the set temperature of the solder processing portion belongs to a first range, may be different from said addition table and said subtraction table referred to when the set temperature of the solder processing portion belongs to the second range.

According to this aspect, it is possible to perform appropriate temperature control according to the set temperature of the solder processing portion.

In the above aspect, said reference value may be a value indicating a number of reference pulse set based on the difference between the set temperatures of said solder processing portion and said detection value acquired by said acquisition portion. Said reference value referred to when said set temperature of said solder processing portion belongs to a first range may be different from said reference value referred to when said set temperature belongs to a second range.

According to this aspect, it is possible to perform appropriate temperature control according to the set temperature of the solder processing portion.

In the above aspect, when said temperature change trend is a temperature rising trend, said setting portion may subtract said correction value from said reference value, to set said number of heat pulse smaller than a number of reference pulse indicated by said reference value, and when said temperature change trend is a temperature declining trend, said setting portion may add said correction value to said reference value, to set said number of heat pulse larger than said number of reference pulse.

According to this aspect, it is possible to suppress overshooting at temperature rising trend without degrading the performance of the solder processing device at temperature declining trend.

In the above aspect, said reference value is a value indicating a number of reference pulse set based on the difference between the set temperature of said solder processing portion and said detection value acquired by said acquisition portion, and said setting portion may set said correction value depending on the difference between a prediction value of temperature change amount of said solder processing portion predicted when said number of reference pulse indicated by said reference value is applied, and an actual measurement value of temperature change amount of said solder processing portion calculated from said detection value detected by said detecting portion.

According to this aspect, it is possible to set an appropriate number of heat pulse with high accuracy.

In the above aspect, when said temperature change trend is a temperature declining trend and the difference obtained by subtracting the absolute value of said actual measurement value from the absolute value of said prediction value is negative, or when said temperature change trend is a temperature rising trend and the difference obtained by subtracting the absolute value of said actual measurement value from the absolute value of said prediction value is positive, said setting portion may add said correction value to said reference value, to set said number of heat pulse larger than said number of reference pulse. When said temperature change trend is a temperature declining trend and the difference obtained by subtracting the absolute value of said actual measurement value from the absolute value of said prediction value is positive, or when said temperature change trend is a temperature rising trend and the difference obtained by subtracting the absolute value of said actual measurement value from the absolute value of said prediction value is negative, said setting portion may subtract said correction value from said reference value, to set said number of heat pulse smaller than said number of reference pulse.

According to this aspect, it is possible to set an appropriate number of heat pulse with high accuracy according to the temperature change trend and the magnitude of the prediction value and the actual measurement value.

In the above aspect, said storage portion may store a reference table indicating said reference value, a declining addition table indicating said correction value which is set when said temperature change trend is temperature declining trend and when the difference obtained by subtracting the absolute value of said actual measurement value from said absolute value of said prediction value is negative, a rising addition table indicating said correction value which is set when said temperature change trend is temperature rising trend and when the difference obtained by subtracting the absolute value of said actual measurement value from said absolute value of said prediction value is positive, a declining subtraction table indicating said correction value which is set when said temperature change trend is temperature declining trend and when the difference obtained by subtracting the absolute value of said actual measurement value from said absolute value of said prediction value is positive, a rising subtraction table indicating said correction value which is set when said temperature change trend is temperature rising trend and when the difference obtained by subtracting the absolute value of said actual measurement value from the absolute value of said prediction value is negative. Said declining addition table, said rising addition table, said declining subtraction table and said rising subtraction table are stored as said correction information.

According to this aspect, by separately providing the declining addition table, the declining subtraction table, the rising addition table, and the rising subtraction table, a fine temperature control can be performed.

In the above aspect, said correction value in said declining subtraction table may be set to zero.

According to this aspect, it is possible to appropriately prevent performance of the solder processing device degrading at temperature declining trend.

In the above aspect, said setting portion may set said number of heat pulse of a first control cycle, which is a present control cycle, based on said reference value indicating said number of heat pulse of a second control cycle preceding said first control cycle, and said correction value depending on a temperature change amount of said solder processing portion based on said detection value and said history information of said detection value.

According to this aspect, it is possible to easily and appropriately set the number of heat pulse.

In the above aspect, when said temperature change trend is a temperature rising trend, said setting portion may subtract said correction value from said reference value, to set said number of heat pulse smaller than a number of reference pulse indicated by said reference value, and when said temperature change trend is a temperature declining trend, said setting portion may add said correction value to said reference value, to set said number of heat pulse larger than said number of reference pulse.

According to this aspect, it is possible to suppress overshooting at temperature rising trend without degrading the performance of the solder processing device at temperature declining trend.

In the above aspect, said setting portion may set said correction value based on the temperature change amount between said first control cycle and said second control cycle, and the temperature change amount between said second control cycle and a third control cycle preceding said second control cycle.

According to this aspect, since the correction value can be appropriately set, it is possible to improve the accuracy of the temperature control.

In the above aspect, when said temperature change trend between said first control cycle and said second control cycle and said temperature change trend between said second control cycle and said third control cycle are different from each other, and when the temperature change amount between said first cycle and said second cycle is less than the temperature change amount between the second control cycle and the third control cycle, said setting portion may set said correction value to zero.

According to this aspect, it is possible to suppress the occurrence of erroneous control caused by noise or the like.

According to a second aspect of the disclosure, there is provided a non-transitory computer-readable storage medium storing a program executable by an information processing device installed in a control device configured to control a solder processing device, said solder processing device having a solder processing portion which processes solder, a heating portion which heats said solder processing portion by applying heat pulses, and a detecting member which detects the temperature of said solder processing portion, said program comprising instructions that, when executed by the information processing device, cause the control device to function as: an acquiring means which acquires a detection value of said temperature detected by said detecting member, a specifying means which specifies a temperature change trend of said solder processing portion based on history information of said detection value acquired by said acquiring means, a setting means which sets a number of heat pulse applied to said heating portion by correcting a reference value using a correction value, and a control means which controls the application of said heat pulses to said heating portion based on a setting result of said number of heat pulse set by said setting means, in which said setting means sets said correction value using correction information which is different according to whether said temperature change trend is a temperature rising trend or a temperature declining trend.

According to this aspect, the setting means sets the correction value using correction information which is different according to whether the temperature change trend is a temperature rising trend or a temperature declining trend. Therefore, even if the temperature difference of the set temperature of the solder processing portion and the detection value is the same, different numbers of heat pulse can be set using a correction value which is different at temperature declining trend or at temperature rising trend. Therefore, the number of heat pulse can be set to an optimum value according to the property of the temperature trend. As a result, it is possible to suppress overshooting at temperature rising trend without degrading the performance of the solder processing device at temperature declining trend.

According to a third aspect of the disclosure, there is provided a control method of a solder processing device having a solder processing portion which processes solder, a heating portion which heats said solder processing portion by applying heat pulses, and a detecting member which detects the temperature of said solder processing portion, the control method including acquiring a detection value of said temperature detected by said detecting member, specifying a temperature change trend of said solder processing portion based on history information of said detection value acquired, setting a number of said heat pulse to be applied to said heating portion by correcting a reference value using a correction value, and controlling the application of said heat pulses to said heating portion based on a setting result of said number of heat pulse, in which in setting of said number of heat pulse, said correction value is set using correction information which is different according to whether said temperature change trend is a temperature rising trend or a temperature declining trend.

According to this aspect, in setting the number of heat pulse, the correction value is set using the correction information which is different according to whether the temperature change trend is a temperature rising trend or a temperature declining trend. Therefore, even if the temperature difference of the solder processing portion of the set temperature and the detection value is the same, different numbers of heat pulse can be set using a correction value which is different at temperature declining trend or at temperature rising trend. Therefore, the number of heat pulse can be set to an optimum value according to the property of the temperature trend. As a result, it is possible to suppress overshooting at temperature rising trend without degrading the performance of the solder processing device at temperature declining trend.

According to the disclosure, overshooting can be suppressed without degrading the performance of the solder processing device.

BRIEF DESCRIPTION OF DRAWINGS

FIG. 5 is a figure showing an example of a reference table.

FIG. 6 is a figure showing an example of an addition table.

FIG. 7 is a figure showing an example of a subtraction table.

FIG. 9 is a figure showing a setting method of the number of heat pulse by the setting portion in relation to the first embodiment.

FIG. 10 is a figure showing an example of setting results of the number of heat pulse when temperature is declining.

FIG. 11 is a figure showing an example of setting results of the number of heat pulse when temperature is rising.

FIG. 12 is a figure showing a setting method of the number of heat pulse by the setting portion in relation to the second embodiment.

FIG. 13 is a figure showing a setting method of the number of heat pulse by the setting portion in relation to the third embodiment.

FIG. 15 is a figure showing an example of setting results of the number of heat pulse when temperature is declining.

FIG. 16 is a figure showing an example of setting results of the number of heat pulse when temperature is rising.

DESCRIPTION OF EMBODIMENTS

Figure 1:
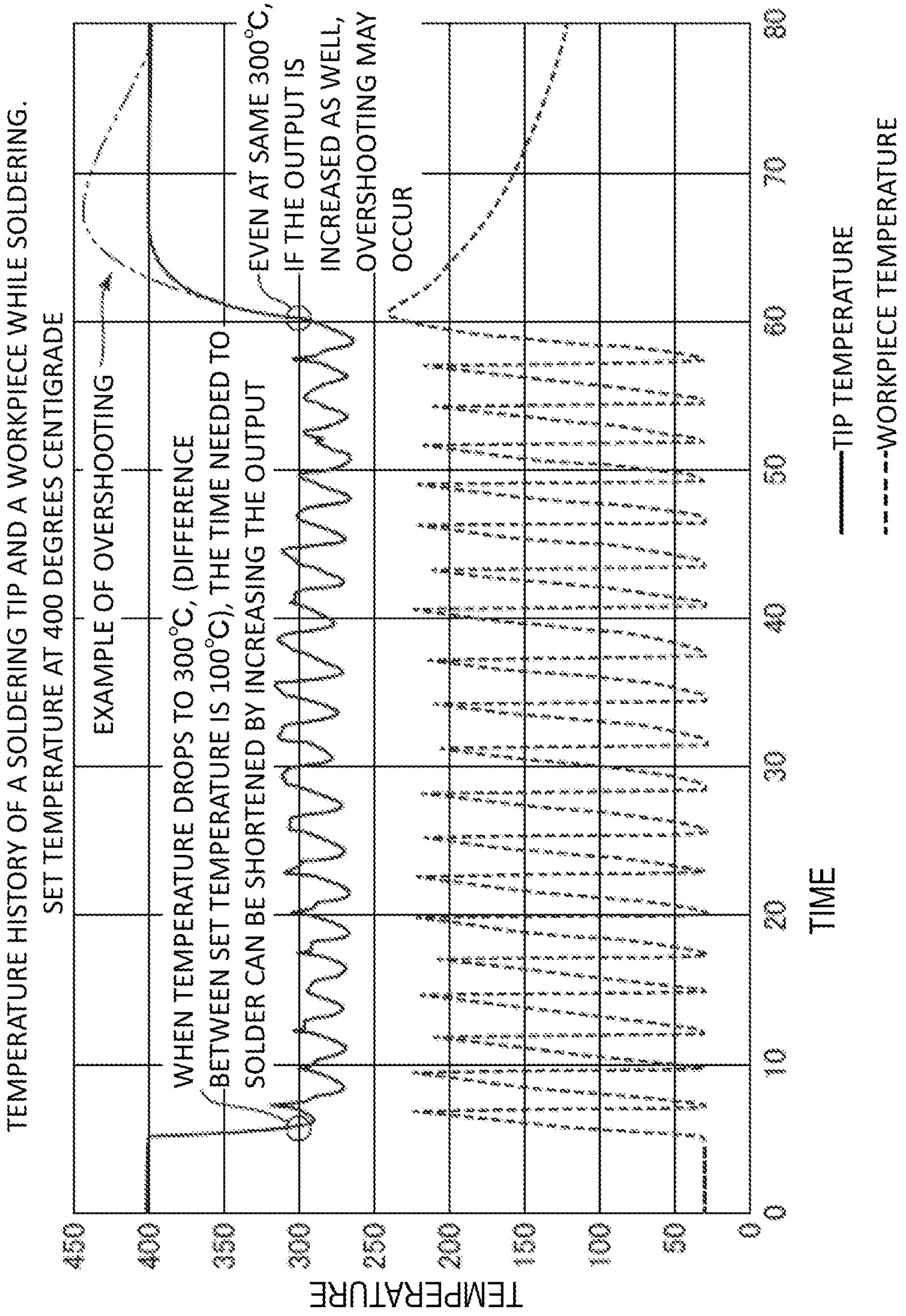
FIG. 1 is a figure showing temperature transitions of a soldering tip and a workpiece during soldering.

Hereinafter, embodiments of the disclosure will be described in detail with reference to the drawings. Elements with the same reference numerals in different drawings indicate the same or corresponding elements.

Figure 2:
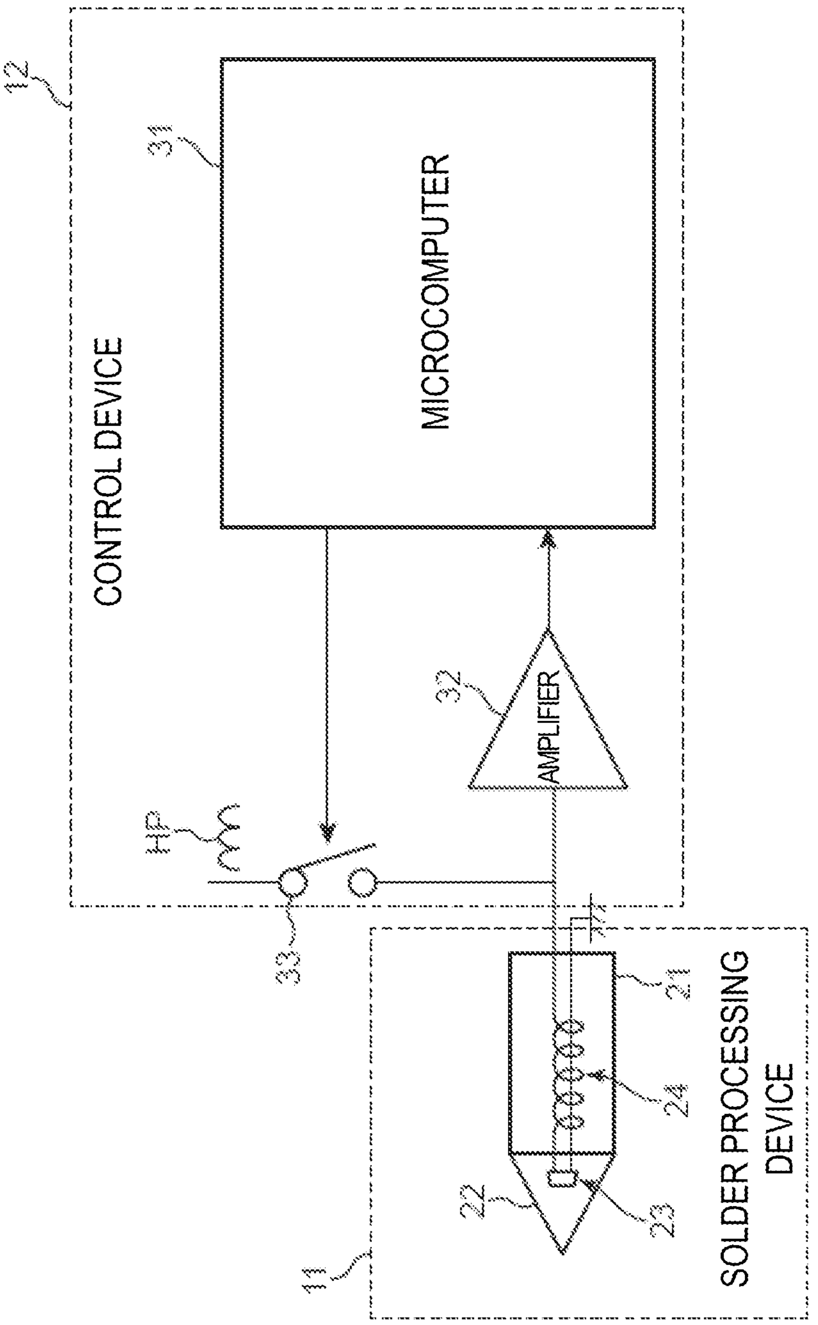
FIG. 2 is a figure showing a simplified configuration of a solder processing system according to an embodiment of the present disclosure.

FIG. 2 is a figure showing a simplified configuration of a solder processing system according to an embodiment of the present disclosure. The solder processing system includes a solder processing device 11 that processes solder and a control device 12 that controls the solder processing device 11. In this embodiment, the solder processing device 11 is a soldering iron. However, the solder processing device 11 may be a de-soldering device, a tweezer, or the like.

The solder processing device 11 includes a soldering iron tip 21, a soldering tip 22 as a solder processing portion which contacts the workpiece to perform soldering, a temperature sensor 23 that detects the temperature of the soldering tip 22, and a heater 24 to heat the soldering tip 22 by having heat pulses HP applied. The temperature sensor 23 is for example, configured by a thermocouple.

The control device 12 is configured as a station wired connected to the solder processing device 11, and includes a microcomputer 31, an amplifier 32 which amplifies the detection value of the temperature of the soldering tip 22 detected by the temperature sensor 23, and a switching element 33 controlled by the microcomputer 31. The switching element 33, for example, is configured by a FET. By the switching element 33 turning on, heat pulses HP is applied to the heater 24 thereby heating the soldering tip 22. When the switching element 33 is turned off, heat pulses HP applied to the heater 24 is stopped, thereby heating the soldering tip 22 is also stopped. The control device 12 may be installed inside the solder processing device 11 by miniaturizing.

Figure 3:
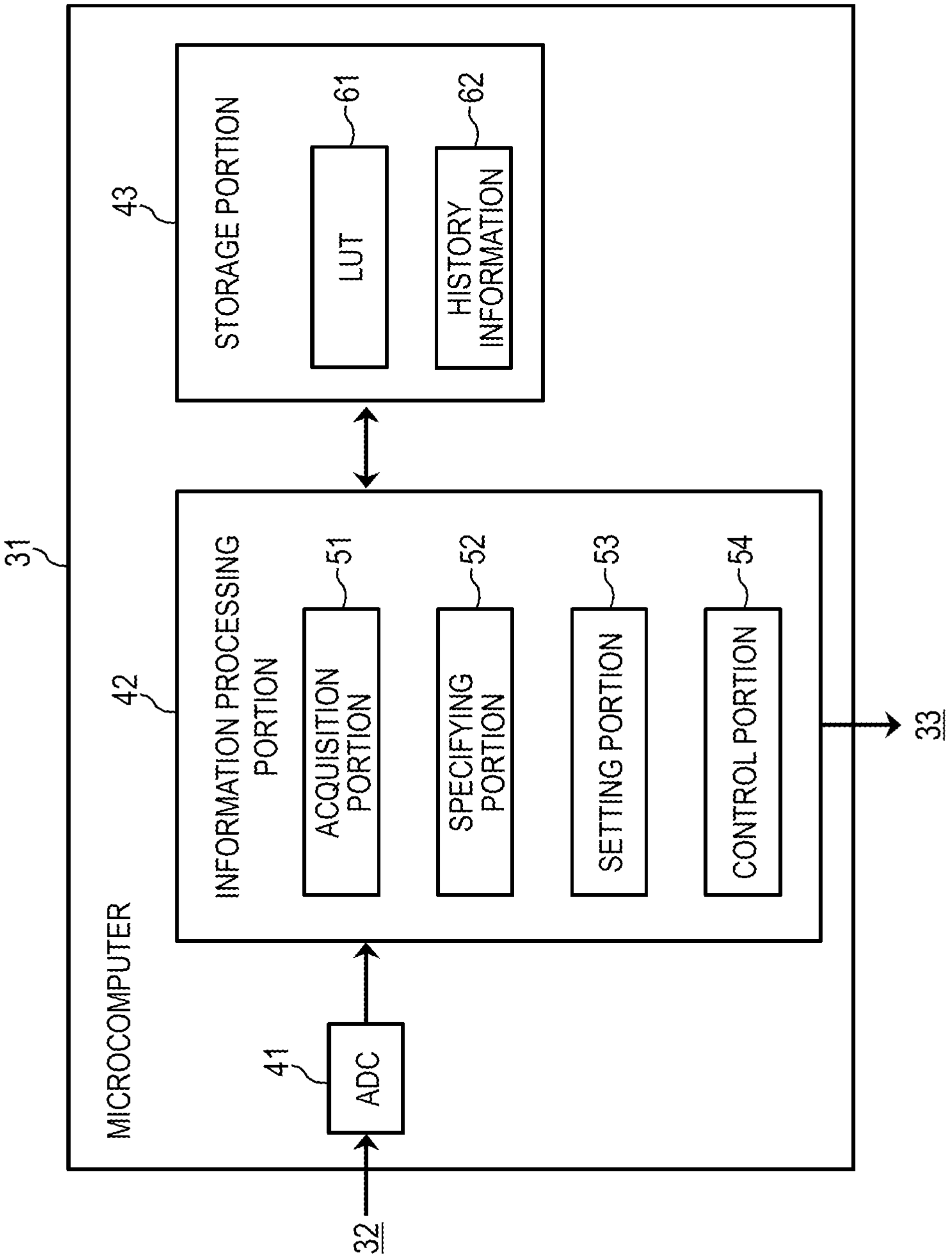
FIG. 3 is a figure showing a simplified configuration of a microcomputer.

FIG. 3 is a figure showing a simplified configuration of the microcomputer 31. The microcomputer 31 have an ADC 41 which converts analog signals to digital signals, an information processing portion 42, and a storage portion 43. The information processing portion 42 is configured by an information processing device such as CPU. The storage portion 43 is configured by HDD, SSD, semiconductor memory, or the like.

The information processing portion 42 includes, an acquisition portion 51, a specifying portion 52, a setting portion 53, and a control portion 54, as functions which is realized by the CPU executing a program read from a storage medium such as a computer-readable ROM. In other words, the program above is a program to function the information processing portion 42 as the information processing device installed in the control device 12, as an acquisition portion 51 (acquisition means), a specifying portion 52 (specification means), and a setting portion 53 (setting means), and a control portion 54 (control means).

The storage portion 43 stores lookup table (hereinafter abbreviated as "LUT") 61 and history information 62.

The acquisition portion 51 acquires the detection value of the temperature of the soldering tip 22 detected by the temperature sensor 23, via the amplifier 32 and the ADC 41. The time-series data of the detection values acquired by the acquisition portion 51 is stored in the storage portion 43 as history information 62. The specifying portion 52 specifies the temperature change trend of the soldering tip 22 based on the history information 62. The temperature change trend includes temperature declining trend, temperature rising trend, and temperature maintaining trend. The setting portion 53 sets the number of heat pulse to be applied to the heater 24 in each control cycle by correcting the reference value using the correction value. The reference value is a value indicating the number of reference pulse which serves as a reference of the number of heat pulse to be applied next. The correction value is a value for correcting the reference value based on the temperature change trend, and includes an addition value to be added to the reference value and a subtraction value to be subtracted from the reference value. The setting portion 53 sets the number of heat pulse according to the temperature change trend of the soldering tip 22, based on the reference value, the value obtained by adding an addition value to the reference value, or the value obtained by subtracting a subtraction value from the reference value. The setting portion 53 sets the correction value using correction information which is different according to whether the temperature change trend is a temperature rising trend or a temperature declining trend. The correction information includes the LUT 61 or an arithmetic expression, etc., and in the following embodiments, the LUT 61 is used. The LUT 61 includes the addition table showing multiple addition values and the subtraction table showing multiple subtraction values. The control portion 54 controls the application of the heat pulse HP to the heater 24 by controlling the switching element 33 for each control cycle, based on the setting result of the number of heat pulse by the setting portion 53.

Figure 4:
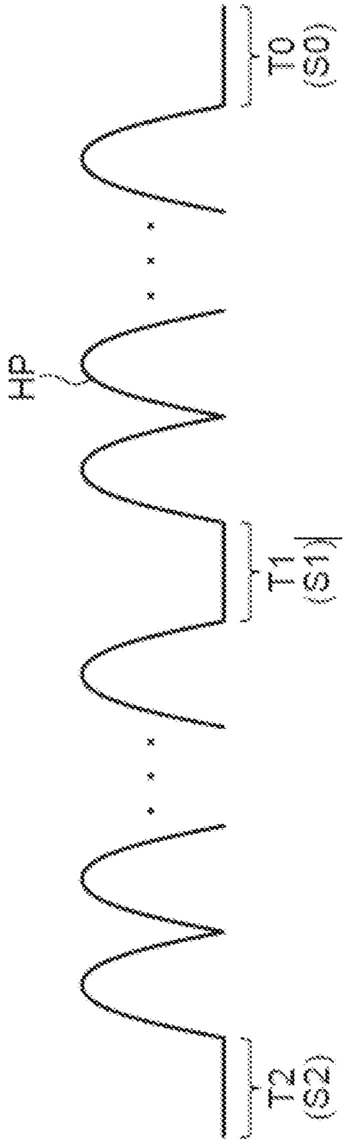
FIG. 4 is a figure showing application control of heat pulses by a control portion.

FIG. 4 is a figure showing application control of the heat pulses HP by the control portion 54. FIG. 4 shows a first control cycle which is the current control cycle, a second control cycle which is the previous control cycle, and the third control cycle which is the control cycle before the previous control cycle. At measurement timing T0 which is the beginning of the first control cycle, the switching element 33 is turned off and the detection value S0 of the temperature sensor 23 is acquired by the acquisition portion 51. At measurement timing T1 which is the beginning of the second control cycle, the switching element 33 is turned off and the detection value S1 of the temperature sensor 23 is acquired by the acquisition portion 51. At measurement timing T2 which is the beginning of the third control cycle, the switching element 33 is turned off and the detection value S2 of the temperature sensor 23 is acquired by the acquisition portion 51.

In this embodiment, the interval between measurement timing T is, for example, 0.3 seconds, and a maximum of 37 heat pulses HP can be included in this 0.3 seconds. In other words, the number of heat pulse that can be applied to the heater 24 in each control cycle is a value set arbitrary from a minimum value of 0 to a maximum value of 37, and is calculated by the setting portion 53. If the calculation result of the number of heat pulse exceeds the maximum value, the setting portion 53 sets the number of heat pulse to the maximum value (in this example, 37). Similarly, if the calculation result of the number of heat pulse is less than the minimum value, the setting portion 53 sets the number of heat pulse to the minimum value (in this example, 0).

The application control of the heat pulse HP by the control portion 54 may exclude the temperature rising right after the power of the solder processing device 11 is turned on, and may be effective after the temperature of the soldering tip 22 first reaches the set temperature.

First Embodiment

In the first embodiment, the reference value is a value indicating the number of reference pulse set based on the difference between the set temperature of the soldering tip 22 and the detection value (S0) acquired by the acquisition portion 51. The setting of the reference value may include reference to the LUT or by calculation using an arithmetic expression, such as what described in JP2001-062562A. In the first embodiment, the setting portion 53 sets the number of heat pulse equal to the number of reference pulse when the temperature change trend is at temperature maintaining trend, and sets the number of heat pulse smaller than the number of reference pulse by subtracting the correction value from the reference value when the temperature change trend is at temperature rising trend, and sets the number of heat pulse larger than the number of reference pulse by adding the correction value to the reference value when the temperature change trend is at temperature declining trend.

In the first embodiment, the setting portion 53 sets the number of heat pulse to be applied next, based on the reference value and the correction value according to the temperature change trend and temperature change amount of the soldering tip 22. This makes it possible to easily and appropriately set the number of heat pulse. The setting portion 53 sets the correction value using the correction information which is different according to whether the temperature change trend is a temperature rising trend or a temperature declining trend. In the first embodiment, the LUT 61 includes a reference table indicating reference values, an addition table indicating addition values which are the correction values to be added to the reference values, and a subtraction table indicating subtraction values which are the correction values to be subtracted from the reference values. The setting portion 53 refers to the subtraction table when the temperature change trend is at temperature rising trend, and refers to the addition table when the temperature change trend is at temperature declining trend.

FIG. 5 is a figure showing an example of a reference table. FIG. 6 is a figure showing an example of an addition table. FIG. 7 is a figure showing an example of a subtraction table.

Referring to FIG. 5, when the temperature difference obtained by subtracting the detection value from the setting temperature of the soldering tip 22 is, for example, 5° C., and 15° C., the number of reference pulse indicated by the reference value is 7, 20, and 28, respectively. That is, when the temperature difference between the set temperature and the detection value gets smaller, the number of reference pulse is set smaller, and when the temperature difference between the set temperature and the detection value is larger, the number of reference pulse is set larger.

The reference table may be provided plurality, according to the temperature range of the set temperature of the soldering tip 22. For example, a reference table for a high temperature range and a reference table for a low temperature range may be separately provided. By providing a plurality of reference tables, the reference value when the set temperature belongs to a first range (for example, the high temperature range) and the reference value when the set temperature belongs to a second range (for example, the low temperature range) will be different. Therefore, appropriate temperature control can be performed according to the set temperature of the soldering tip 22. Note that three (or four or more) reference tables may be provided according to the temperature ranges such as high temperature, medium temperature, and low temperature. This will also apply to the second embodiment which is described later.

Referring to FIG. 6, when the temperature change trend of the soldering tip 22 is a temperature declining trend, meaning that the temperature difference obtained by subtracting the detection value S1 of the second control cycle from the detection value S0 of the first control cycle is negative, and when the absolute values of the difference between the detection value S0 and the detection value S1 is, for example, 5° C., 10° C., and 15° C., the number of addition pulse (correction value) indicated by the addition value is 4, 8, and 21, respectively. Referring to FIG. 7, when the temperature change trend is a temperature declining trend, meaning that the difference obtained by subtracting the detection value S1 of the second control cycle from the detection value S0 of the first control cycle is positive, and when the absolute values of the difference between the detection value S0 and the detection value S1 is, for example, 5° C., 10° C., and 15° C., the number of subtraction pulse (correction value) indicated by the subtraction value is 3, 5, and 9, respectively.

The addition table and subtraction table may be provided plurality, according to the temperature range of the set temperature of the soldering tip 22. For example, an addition table and a subtraction table for the high temperature range and an addition table and a subtraction table for the low temperature range may be separately provided. Therefore, appropriate temperature control can be performed according to the set temperature of the soldering tip 22. In this case, only one reference table may be provided, or a plurality of reference tables may be provided according to temperature ranges as described above. This will also apply to the second embodiment described later.

Figure 8:
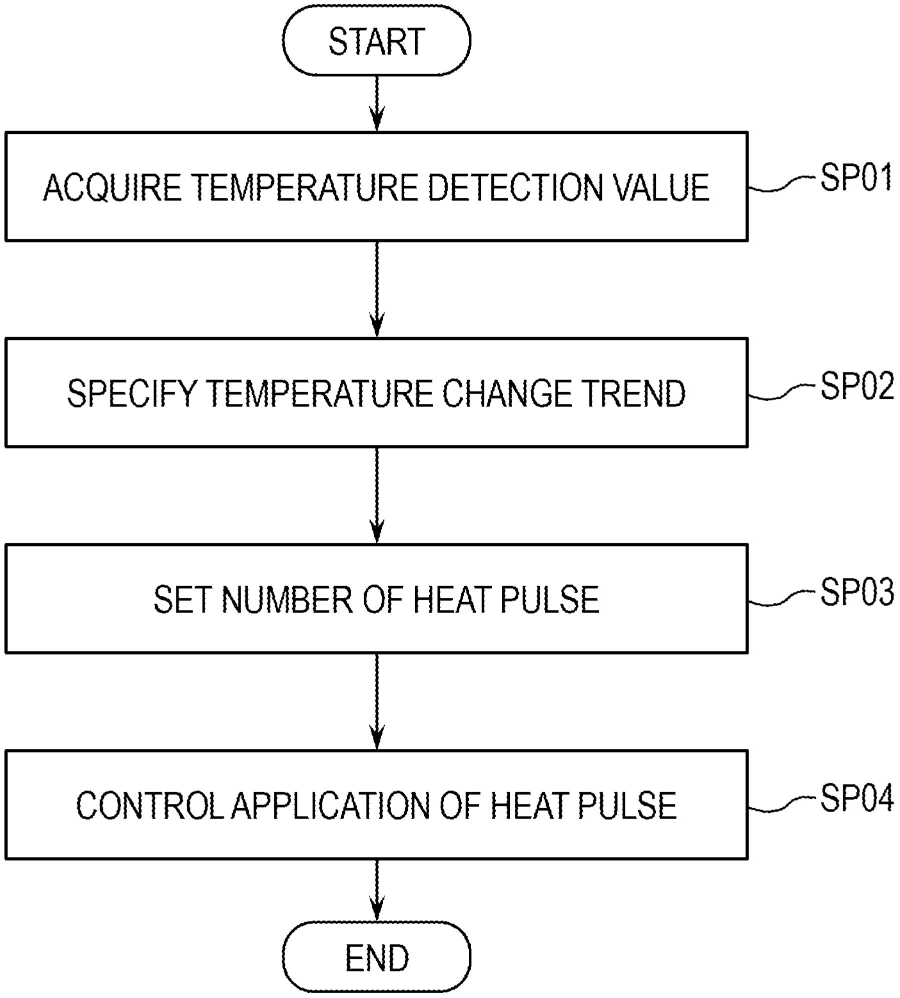
FIG. 8 is a flowchart showing process executed by an information processing portion.

FIG. 8 is a flow chart showing process executed by the information processing portion 42.

First, in step SP01, the acquisition portion 51 acquires the detected temperature value of the soldering tip 22 detected by the temperature sensor 23 via the amplifier 32 and the ADC 41. The time-series data of the detection values acquired by the acquisition portion 51 is stored in the storage portion 43 as history information 62.

Next, at step SP02, the specifying portion 52 specifies the temperature change trend of the soldering tip 22 based on the history information 62. The specifying portion 52 compares the detection value S0 and the detection value S1, and if the detection value S0 is smaller than the detection value S1, the temperature change trend is specified as a temperature declining trend, and if the detection value S0 is larger than the detection value S1, the temperature change trend is specified as a temperature rising trend, and if the detection value S0 is equal to the detection value S1, the temperature change trend is specified as a temperature maintaining trend. The object of comparison with detection value S0 is not limited to detection value S1, but may be detection value S2, or may be the average value of the detection value S1 and the detection value S2.

Next, in step SP03, the setting portion 53 sets the number of heat pulse to be applied to the heater 24 in the first control cycle by correcting the reference value using the correction value. The setting portion 53 sets the number of heat pulse based on the reference table indicating the number of reference pulse and an addition table or a subtraction table corresponding to the temperature change amount of the soldering tip 22.

FIG. 9 is a figure showing a method of setting the number of heat pulse P by the setting portion 53 in relation to the first embodiment.

ΔT is the temperature change amount obtained by subtracting the detection value S1 from the detection value S0.

$P^+$ is the number of addition pulse set by the addition table.

$P^-$ is the number of subtraction pulse set by the subtraction table.

P is the number of heat pulse set for the first control cycle (the number of heat pulse to be applied next).

P0 is the number of reference pulse set by the reference table.

When condition 1 applies to temperature maintaining trend ($\Delta T=0$), the setting portion 53 sets the number of heat pulse P (=P0) equal to the number of reference pulse set by the reference table.

When condition 1 applies to temperature rising trend ($\Delta T>0$), by subtracting the number of subtraction pulse set by the subtraction table from the number of reference pulse set by the reference table, the setting portion 53 sets the number of heat pulse P ($=P0-P^-$). That is, when the specifying portion 52 specifies that it is temperature rising trend, the setting portion 53 subtracts the correction value from the reference value to set the number of heat pulse smaller than the number of reference pulse. As a result, excessive power supply to the heater 24 can be suppressed, and overshooting can be appropriately suppressed as indicated by the solid line in FIG. 1.

When condition 1 applies to temperature declining trend ($\Delta T<0$), by adding the number of addition pulse set by the addition table to the number of reference pulse set by the reference table, the setting portion 53 sets the number of heat pulse P (=P0+$P^+$). As a result, additional power is supplied to the heater 24 when there is a large load to the soldering tip 22.

Next, in step SP04, the control portion 54 controls the application of the heat pulse HP to the heater 24 by controlling the switching element 33 in each control cycle based on the setting result of the number of heat pulse by the setting portion 53.

According to the first embodiment, the setting portion 53 uses the correction information (for example, the addition table or the subtraction table) to set the correction value, which is different according to whether the temperature change trend of the soldering tip 22 is at temperature rising trend or at temperature declining trend. Therefore, even if the temperature difference between the set temperature of the soldering tip 22 and the detection value is the same, different number of heat pulse can be set using the correction value which is different at temperature declining trend and at temperature rising trend. This way, the number of heat pulse can be set to an optimum value according to the property of temperature change trend. As a result, it is possible to suppress overshooting at temperature rising trend without degrading the performance of the solder processing device 11 at temperature declining trend.

FIG. 10 is a figure showing an example of setting result of the number of heat pulse when the temperature is dropping. Compared with the conventional method in which the number of heat pulse is set based on the difference from the set temperature, the inventive method using the reference value and the correction value tends to set the number of heat pulse larger than the conventional method as the sensor temperature (detection value) declines during temperature drop. Thus, according to the inventive method, the performance of the solder processing device 11 degrading is effectively avoided while temperature is dropping.

FIG. 11 is a figure showing an example of setting result of the number of heat pulse when the temperature is rising. Compared to the conventional method, while the temperature rise, the inventive method using the reference value and the correction value tends to set the number of heat pulse smaller than the conventional method when the sensor temperature rises. Thus, according to the inventive method, overshooting is effectively suppressed while temperature is rising.

Second Embodiment

In the second embodiment, the reference value is a value indicating the number of reference pulse set based on the difference between the set temperature of the soldering tip 22 and the detection value (S0) acquired by the acquisition portion 51. The setting of the reference value may include reference to the LUT or calculation using an arithmetic expression. In the second embodiment, the setting portion 53 sets the correction value according to the difference between a prediction value of the temperature change amount of the soldering tip 22 predicted when a number of reference pulse indicated by the reference value is applied, and an actual measurement value of the temperature change amount of the soldering tip 22 calculated from the detection value detected from the temperature sensor 23.

Specifically, when the temperature change trend is at temperature declining trend and the difference obtained by subtracting the absolute value of the actual measurement value of the temperature change amount from the absolute value of the prediction value of the temperature change amount is negative (i.e., If the absolute value of the actual measurement value exceeds the absolute value of the prediction value of the temperature change amount), or when the temperature change trend is a temperature rising trend and the difference obtained by subtracting the absolute value of the actual measurement value of the temperature change amount from the absolute value of the prediction value of the temperature change amount is positive, (i.e., when the absolute value of the actual measurement value of the temperature change amount is less than the absolute value of the prediction value of the temperature change amount), the setting portion 53 adds the correction value to the reference value, to set the number of heat pulse larger than the number of reference pulse. Further, when the temperature change trend is at temperature declining trend and the difference obtained by subtracting the absolute value of the actual measurement value of the temperature change amount from the absolute value of the prediction value of the temperature change amount is positive (i.e., If the absolute value of the actual measurement value is less than the absolute value of the prediction value of the temperature change amount), or when the temperature change trend is a temperature rising trend and the difference obtained by subtracting the absolute value of the actual measurement value of the temperature change amount from the absolute value of the prediction value of the temperature change amount is negative, (i.e., when the absolute value of the actual measurement value of the temperature change amount exceeds the absolute value of the prediction value of the temperature change amount), the setting portion 53 subtracts the correction value from the reference value, to set the number of heat pulse smaller than the number of reference pulse. This makes the setting of number of heat pulse simple and appropriate. Here, a prediction value is the prediction value of the temperature change amount of how much the detection value of the temperature sensor 23 changes if the number of reference pulse is applied. In practice, the detection value after applying the heat pulse often differs from the prediction value due to the heat load such as the size of the workpiece applied to the soldering tip 22 or by other external factors, so the correction value according to the difference of the prediction value and the actual measurement value is used in this embodiment. The setting portion 53 sets a correction value which is different according to whether the temperature change trend is a temperature rising trend or a temperature declining trend, but since the correction value used is according to the difference of the prediction value and the actual measurement value, it includes the case when the correction value is coincidentally the same at temperature rising trend and at temperature declining trend. Further in the second embodiment, the LUT 61 includes a reference table (e.g., FIG. 5) indicating reference value, an addition table (e.g., FIG. 6) indicating addition value which is the correction value to be added to the reference value, and a subtraction table (e.g., FIG. 7) indicating subtraction value which is the correction value to be subtracted from the reference value.

Referring to FIG. 6, when the absolute value of the temperature difference obtained by subtracting the actual measurement value from the prediction value of the temperature change amount of the soldering tip 22 is, for example, 5° C., 10° C., and 15° C., the number of addition pulse (correction value) indicated by the addition value is 4, 8, and 21, respectively. Referring to FIG. 7, when the absolute value of the temperature difference obtained by subtracting the actual measurement value from the prediction value of the temperature change amount of soldering tip 22 is, for example, 5° C., 10° C., and 15° C., the number of subtraction pulse (correction value) indicated by the subtraction value is 3, 5, and 9, respectively.

The addition table may be provided separately as the addition table for temperature declining trend (declining addition table) and as the addition table for temperature rising trend (rising addition table). The declining addition table indicates the correction value set when the specifying portion 52 specifies that it is temperature declining trend, and the difference obtained by subtracting the absolute value of the actual measurement value of the temperature change amount from the absolute value of the prediction value of the temperature change amount is negative. (i.e., when the absolute value of the actual measurement value of the temperature change amount is larger than the absolute value of the prediction value.) The rising addition table indicates the correction value set when the specifying portion 52 specifies that it is temperature rising trend, and the difference obtained by subtracting the absolute value of the actual measurement value of the temperature change amount from the absolute value of the prediction value of the temperature change amount is positive. (i.e., when the absolute value of the actual measurement value of the temperature change amount is smaller than the absolute value of the prediction value.)

Similarly, the subtraction table may be provided separately as a subtraction table for temperature declining trend (declining subtraction table) and as a subtraction table for temperature rising trend (rising subtraction table). The declining subtraction table indicates the correction value set when the specifying portion 52 specifies that it is temperature declining trend, and the difference obtained by subtracting the absolute value of the actual measurement value of the temperature change amount from the absolute value of the prediction value of the temperature change amount is positive. (i.e., when the absolute value of the actual measurement value of the temperature change amount is smaller than the absolute value of the prediction value.) The rising subtraction table indicates the correction value set when the specifying portion 52 specifies that it is temperature rising trend, and the difference obtained by subtracting the absolute value of the actual measurement value of the temperature change amount from the absolute value of the prediction value of the temperature change amount is negative. (i.e., when the absolute value of the actual measurement value of the temperature change amount is larger than the absolute value of the prediction value.)

By separately providing the declining addition table, declining subtraction table, rising addition table, and rising subtraction table, fine temperature control can be performed.

Further, for the declining subtraction table, all correction value may be set to zero. In this case, even if the actual measured value of the temperature change amount is smaller than the prediction value at temperature declining trend, the number of heat pulse will be equal to the number of reference pulse regardless of the difference between the prediction value and the actual measurement value of the temperature change amount. This is intended to stop to correct lowering the output, presuming there is no concern of overshooting at temperature declining trend. In this way, it is possible to appropriately prevent degrading the performance of the solder processing device 11 at temperature declining trend.

The process executed by the information processing portion 42 according to the second embodiment is shown by the flowchart in FIG. 8. The process of steps SP01, SP02 and SP04 are the same as in the first embodiment.

At step SP03, the setting portion 53 sets the number of heat pulse to be applied to the heater 24 in the first control cycle by correcting the reference value using the correction value. The setting portion 53 sets the number of heat pulse based on a reference table indicating the number of reference pulse and an addition table or a subtraction table indicating the correction value according to the difference between the prediction value and the actual measurement value of the temperature change amount of the soldering tip 22.

FIG. 12 is a figure showing a method of setting the number of heat pulse P by the setting portion 53 in relation to the second embodiment.

ΔT is the temperature change amount obtained by subtracting the detection value S1 from the detection value S0.

ΔTup is the absolute value of the actual measurement value of the temperature change amount (temperature rising amount) obtained by subtracting the detection value S1 from the detection value S0 at temperature rising trend. The setting portion 53 calculates the actual measurement value of the temperature change amount based on the history information 62 of the detection value.

ΔTupP is the absolute value of the prediction value of the amount of temperature change (temperature rising amount) after the detection value S1 predicted at measurement timing T0, at temperature rising trend. The setting portion 53 calculates the prediction value of the temperature change amount, based on the history information of the set value of the number of heat pulse in the past control cycle, the set temperature of the soldering tip 22, and the history information 62 of the detection value. The prediction value of the temperature change amount may alternatively be obtained based on a predetermined prediction table. The prediction table shows prediction values of temperature change when the number of reference pulse is applied to a specific type of tip, and is predetermined by experiments, simulations, or the like. In this case, different prediction tables may be used at temperature rising trend and at temperature declining trend.

ΔTdown is the absolute value of the actual measurement value of the temperature change amount (temperature declining amount) obtained by subtracting the detection value S1 from the detection value S0 at temperature declining trend.

ΔTdownP is the absolute value of the prediction value of the amount of temperature change (temperature declining amount) after the detection value S1 predicted at the measurement timing T0, at temperature declining trend.

$P^{+}$ is the number of addition pulse set by the addition table.

$P^{-}$ is the number of subtraction pulse set by the subtraction table.

P is the number of heat pulses set for the first control cycle (the number of pulses applied next).

P0 is the number of reference pulse set by the reference table.

When at temperature maintaining trend according to condition 1 (ΔT=0), the setting portion 53 sets the number of heat pulse equal to the number of reference pulse set by the reference table. P (=P0).

When at temperature rising trend according to condition 1 (ΔT>0), the setting portion 53 calculates "ΔTupP-ΔTup". When the calculation result is negative (<0) according to condition 2, the setting portion 53 determines that the temperature rise is greater than the prediction, and subtracts the number of subtraction pulse set by the subtraction table from the number of reference pulse set by the reference table, thereby setting the number of heat pulses P (=P0−$P^-$). That is, when the specifying portion 52 specifies that it is at temperature rising trend and when the absolute value of the actual measurement value of the temperature change amount is greater than the absolute value of the prediction value of the temperature change amount, the setting portion 53 subtracts the correction value from the reference value, and set the number of heat pulses smaller than the number reference pulse. As a result, excessive power supply to the heater 24 can be suppressed, and overshooting can be appropriately suppressed as indicated by the solid line in FIG. 1. Further, when the calculation result is positive (>0) according to condition 2, the setting portion 53 determines that the temperature rise is smaller than the prediction, and adds the number of addition pulse set by the addition table to the number of reference pulse set by the reference table, thereby setting the number of heat pulse P (=P0+$P^+$). As a result, the soldering tip 22 may recover to the set temperature quickly and reliably. Further, when the calculation result is zero according to condition 2, the setting portion 53 sets the number of heat pulse equal to the number of reference pulse set by the reference table. P (=P0).

When at temperature declining trend according to condition 1 (ΔT<0), the setting portion 53 calculates "ΔTdownP-ΔTdown". When the calculation result is negative (<0) according to condition 2, the setting portion 53 determines that the temperature drop is greater than the prediction, and adds the number of additional pulse set by the addition table to the number of reference pulse set by the reference table, thereby setting the number of heat pulse P (=P0+$P^+$). As a result, additional power is supplied to the heater 24 when a large load than expected is applied to the soldering tip 22. Further, when the calculation result is positive (>0) according to condition 2, the setting portion 53 determines that the temperature drop is smaller than the prediction, and subtracts the number of subtraction pulse set by the subtraction table from the number of reference pulse set by the reference table, thereby setting the number of heat pulse P (=P0−$P^-$). As a result, the heat supply other than the heat necessary for recovering the temperature of the soldering tip 22 is suppressed, and suppress excess heat accumulation in soldering iron tip 21. Further, when the calculation result is zero according to condition 2, the setting portion 53 sets the number of heat pulse equal to the number of reference pulse set by the reference table P (=P0).

According to the second embodiment, in addition to the effects obtained by the first embodiment, by the setting portion 53 setting the correction value according to the difference between the prediction value and the actual measurement value of the temperature change amount of the soldering tip 22, an appropriate number of heat pulse can be set with high accuracy.

Third Embodiment

In the third embodiment, the reference value is a value indicating the number of heat pulse in the second control cycle, which is the previous control cycle.

In the third embodiment, the setting portion 53 sets the number of heat pulse of the first control cycle based on the reference value indicating the number of heat pulse in the second control cycle, and the correction value according to the amount of temperature change of the soldering tip 22 based on the detection value and the history information of the detection value. This way, it is possible to easily and appropriately set the number of heat pulse.

Specifically, when the temperature change trend of the soldering tip 22 is at temperature rising trend, the setting portion 53 subtracts the correction value from the reference value, to set the number of heat pulse smaller than the number of reference pulse. Further, when the temperature change trend of the soldering tip 22 is at temperature declining trend, the setting portion 53 adds the correction value to the reference value, to set the number of heat pulse larger than the number of reference pulse. In the third embodiment, the LUT 61 includes an addition table indicating number of addition value (for example, FIG. 6) and a subtraction table indicating number of subtraction value (for example, FIG. 7).

The process executed by the information processing portion 42 according to the third embodiment is shown by the flowchart in FIG. 8. The processes of steps SP01, SP02 and SP04 are the same as those in the first embodiment.

At step SP03, the setting portion 53 sets the number of heat pulse to be applied to the heater 24 in the first control cycle by correcting the reference value using the correction value. The setting portion 53 sets the number of heat pulse in the first control based on the reference value indicating the number of heat pulse in the second control cycle and the correction value according to the temperature change amount of the soldering tip 22 based on the detection value and the history information of the detection value.

Figure 14:
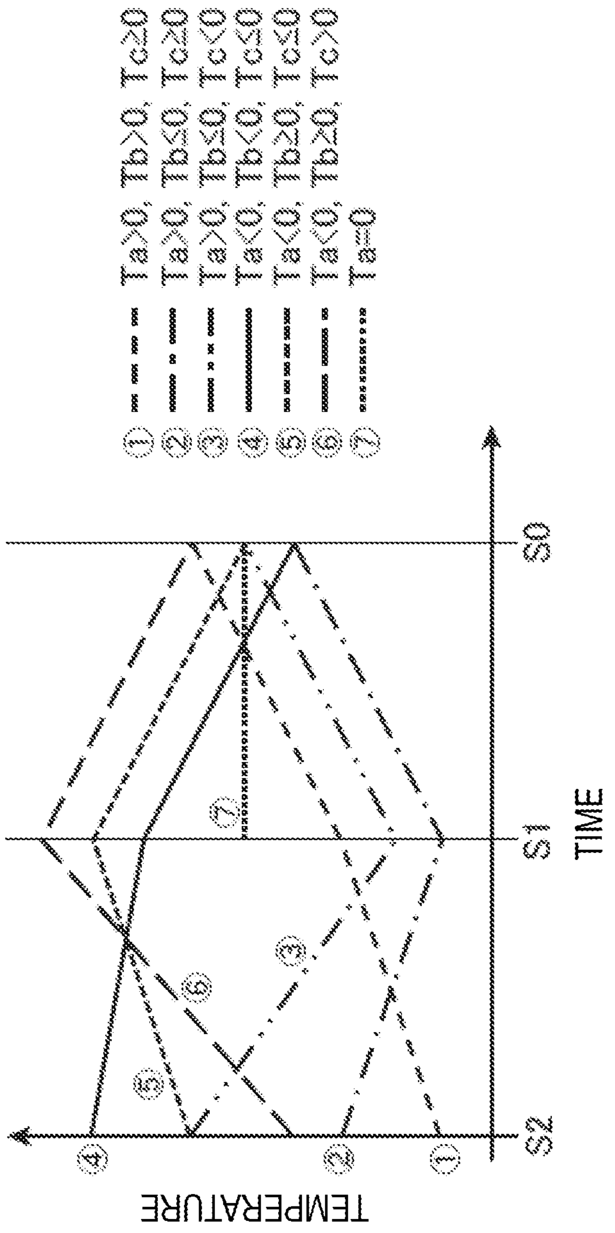
FIG. 14 is a figure showing conditions for the setting method of the number of heat pulse by the setting portion in relation to the third embodiment.

FIG. 13 and FIG. 14 are figures showing the method of setting the number of heat pulse P by the setting portion 53 in relation to the third embodiment.

Ta is the temperature change amount obtained by subtracting the detection value S1 of the second control cycle from the detection value S0 of the first control cycle.

Tb is the temperature change amount obtained by subtracting the detection value S2 of the third control cycle from the detection value S1 of the second control cycle.

Tc is the temperature change amount obtained by subtracting the detection value S2 of the third control cycle from the detection value S0 of the first control cycle.

$Pa^+$ is the number of addition pulse set by the addition table based on the temperature change amount Ta.

$Pa^-$ is the number of subtraction pulse set by the subtraction table based on the temperature change amount Ta.

$Pb^+$ is the number of addition pulse set by the addition table based on the temperature change amount Tb.

$Pb^-$ is the number of subtraction pulse set by the subtraction table based on the temperature change amount Tb.

P is the number of heat pulse set for the first control cycle (the number of pulses applied next).

P0 is the number of heat pulse (number of reference pulse) set in the second control cycle.

When at temperature maintaining trend according to condition 1 (Ta=0), the setting portion 53 sets the number of heat pulse equal to the number of reference pulse. P (=P0).

When at temperature rising trend according to condition 1 (Ta>0), the setting portion 53 determines whether Tb is positive (>0), or either negative or 0 (≤0), according to condition 2. When Tb is positive, then Tc is positive or 0 (≥0) according to condition 3. When Tc is positive or 0 (when the characteristic is the first one in FIG. 14), the setting portion 53 sets the number of heat pulse by subtracting the total of $Pa^-$ and $Pb^-$ from P0. P ($=P0-(Pa^-+Pb^-)$). That is, when the specifying portion 52 specifies that it is temperature rising trend, the setting portion 53 subtracts the correction value from the reference value and set the number of heat pulse to be less than the number of reference pulse. This way, excess power supply to the heater 24 is suppressed and overshooting is appropriately suppressed. When Tb is negative or 0, the setting portion 53 determines whether Tc is either positive or 0 ($\geq 0$), or negative ($<0$), according to Condition 3. When Tc is positive or 0 (when the characteristic is the second one in FIG. 14), the setting portion 53 sets the number of heat pulse by subtracting $Pa^-$ from P0. P ($=P0-Pa^-$). This way, excess power supply to the heater 24 is suppressed and overshooting is appropriately suppressed. When Tc is negative (when the characteristic is the third one in FIG. 14), the setting portion 53 sets the number of heat pulse equal to the number of reference pulse. P (=P0). That is, when the temperature change trend between the first control cycle and the second control cycle is different from the temperature change trend between the second control cycle and the third control cycle, and when the temperature change amount between the first control cycle and the second control cycle is less than the temperature change amount between the second control cycle and the third control cycle, the setting portion 53 sets the correction value to zero. As a result, it is possible to suppress the occurrence of erroneous control caused by noise or the like. Accordingly, the correction value may be appropriately set based on the degree of temperature rising trend or temperature declining trend comparing not just the detection value immediately before, but including plurality of cycles before from the history.

When at temperature declining trend according to condition 1 ($Ta<0$), the setting portion 53 determines whether Tb is negative ($<0$), or either positive or 0 ($\geq 0$), according to condition 2. When Tb is negative, Tc is negative or 0 ($\leq 0$) according to condition 3. When Tc is negative or 0 (when the characteristic is the fourth one in FIG. 14), the setting portion 53 sets the number of heat pulse by adding the total of $pa^+$ and $Pb^+$ to P0. P ($=P0+(Pa^++Pb^+)$). This way, additional power is supplied to the heater 24 when heavy load is applied to the soldering tip 22. When Tb is positive or 0, the setting portion 53 determines whether Tc is either negative or 0 ($\leq 0$), or positive ($>0$), according to condition 3. When Tc is negative or 0 (when the characteristic is the fifth one in FIG. 14), the setting portion 53 sets the number of heat pulses by adding $pa^+$ to P0. P ($=P0+Pa^+$). This way, additional power is supplied to the heater 24 when heavy load is applied to the soldering tip 22. If Tc is positive (when the characteristic is the sixth one in FIG. 14), the setting portion 53 sets the number of heat pulse equal to the number of reference pulse. P (=P0). As a result, it is possible to suppress the occurrence of erroneous control caused by noise or the like. Accordingly, the correction value may be appropriately set based on the degree of temperature rising trend or temperature declining trend comparing not just the detection value immediately before, but including plurality of cycles before from the history.

According to the third embodiment, similarly to the first embodiment, it is possible to suppress overshooting at temperature rising trend without degrading the performance of the solder processing device 11 at temperature declining trend.

FIG. 15 is a figure showing an example of the setting result of the number of heat pulse when temperature declines. Compared with the conventional method in which the number of heat pulse is set based on the difference from the set temperature, the inventive method using the reference value and the correction value tends to set the number of heat pulse more than the conventional method as the sensor temperature (detection value) gets lower. Therefore, according to the inventive method, degrading the performance of the solder processing device 11 is effectively avoided when the temperature drops.

FIG. 16 is a figure showing an example of setting result of the number of heat pulse when the temperature rises. Compared with the conventional method, the inventive method using the reference value and the correction value tends to set the number of heat pulse less than the conventional method as the sensor temperature rises. Therefore, according to the inventive method, overshooting is effectively suppressed when the temperature rises.

When the temperature of the soldering tip 22 recovers to the set temperature during control, the number of heat pulse relating to the previous control cycle (i.e., the reference value) may be reset to zero.

Further, plurality of addition tables and subtraction tables may be provided according to the temperature range of the set temperature of the soldering tip 22.

Further, the setting portion 53 use the current detection value S0, the previous detection value S1, and the two previous detection value S2 to set the number of heat pulse P, but three previous or even earlier detection values may also be used. Alternative to using the previous and the two previous detection values, detection values such as two previous and four previous may be used. Further, average value of plurality of detection values may be used.

What is claimed is:

1. A control device configured to control a solder processing device having a solder processing portion which processes solder, a heating portion which heats said solder processing portion by applying heat pulses, and a detecting member which detects a temperature of said solder processing portion, the control device comprising:

an acquisition portion which acquires a detection value of said temperature detected by said detecting member;

a specifying portion which specifies a temperature change trend of said solder processing portion based on history information of said detection value acquired by said acquisition portion;

a setting portion which sets a number of said heat pulse to be applied to said heating portion by correcting a reference value using a correction value;

a control portion which controls the application of said heat pulses to said heating portion based on a setting result of said number of heat pulse by said setting portion; and a storage portion which stores said history information, wherein said setting portion sets said correction value using correction information which is different according to whether said temperature change trend is a temperature rising trend or a temperature declining trend.

2. The control device according to claim 1, wherein said correction information includes an addition table indicating an addition value to be added to said reference value and a subtraction table indicating a subtraction value to be subtracted from said reference value stored in said storage portion, said correction value is said addition value indicated by said addition table or said subtraction value indicated by said subtraction table, and said setting portion sets said number of heat pulse according to said temperature change trend, based on said reference value, a value obtained by adding said addition value to said reference value, or a value obtained by subtracting said subtraction value from said reference value.

3. The control device according to claim 2, wherein said addition table and said subtraction table referred to when the set temperature of the solder processing portion belongs to a first range are different from said addition table and said subtraction table referred to when the set temperature of the solder processing portion belongs to a second range.

4. The control device according to claim 1, wherein said reference value is a value indicating a number of reference pulse set based on the difference between the set temperatures of said solder processing portion and said detection value acquired by the acquisition portion, and said reference value referred to when said set temperature of said solder processing portion belongs to a first range is different from said reference value referred to when said set temperature belongs to a second range.

5. The control device according to claim 1, wherein when said temperature change trend is a temperature rising trend, said setting portion subtracts said correction value from said reference value, to set said number of heat pulse smaller than a number of reference pulse indicated by said reference value, and when said temperature change trend is a temperature declining trend, said setting portion adds said correction value to said reference value, to set said number of heat pulse larger than said number of reference pulse.

6. The control device according to claim 1, wherein said reference value is a value indicating a number of reference pulse set based on the difference between the set temperature of the said solder processing portion and said detection value acquired by said acquisition portion, and said setting portion sets said correction value depending on the difference between a prediction value of temperature change amount of said solder processing portion predicted when said number of reference pulse indicated by said reference value is applied, and an actual measurement value of temperature change amount of said solder processing portion calculated from said detection value detected by said detecting portion.

7. The control device according to claim 6, wherein when said temperature change trend is a temperature declining trend and the difference obtained by subtracting the absolute value of said actual measurement value from the absolute value of said prediction value is negative, or when said temperature change trend is a temperature rising trend and the difference obtained by subtracting the absolute value of said actual measurement value from the absolute value of said prediction value is positive, said setting portion adds said correction value to said reference value, to set said number of heat pulse larger than said number of reference pulse, and when said temperature change trend is a temperature declining trend and the difference obtained by subtracting the absolute value of said actual measurement value from the absolute value of said prediction value is positive, or when said temperature change trend is a temperature rising trend and the difference obtained by subtracting the absolute value of said actual measurement value from the absolute value of said prediction value is negative, said setting portion subtracts said correction value from said reference value, to set said number of heat pulse smaller than said number of reference pulse.

8. The control device according to claim 7, wherein said storage portion stores:

a reference table indicating said reference value;

a declining addition table indicating said correction value which is set when said temperature change trend is a temperature declining trend and when the difference obtained by subtracting the absolute value of said actual measurement value from said absolute value of said prediction value is negative;

a rising addition table indicating said correction value which is set when said temperature change trend is temperature rising trend and when the difference obtained by subtracting the absolute value of said actual measurement value from said absolute value of said prediction value is positive;

a declining subtraction table indicating said correction value which is set when said temperature change trend is temperature declining trend and when the difference obtained by subtracting the absolute value of said actual measurement value from the absolute value of said prediction value is positive; and a rising subtraction table indicating said correction value which is set when said temperature change trend is temperature rising trend and when the difference obtained by subtracting the absolute value of said actual measurement value from the absolute value of said prediction value is negative, and said declining addition table, said rising addition table, said declining subtraction table and said rising subtraction table are stored as said correction information.

9. The control device according to claim 1, wherein said correction value in said declining subtraction table is set to zero.

10. The control device according to claim 1, wherein said setting portion sets said number of heat pulse of a first control cycle, which is a present control cycle, based on said reference value indicating said number of heat pulse of a second control cycle preceding said first control cycle, and said correction value depending on a temperature change amount of said solder processing portion based on said detection value and said history information of said detection value.

11. The control device according to claim 10, wherein when said temperature change trend is a temperature rising trend, said setting portion subtracts said correction value from said reference value, to set said number of heat pulse smaller than a number of reference pulse indicated by said reference value, and when said temperature change trend is a temperature declining trend, said setting portion adds said correction value to said reference value, to set said number of heat pulse larger than said number of reference pulse.

12. The control device according to claim 10, wherein said setting portion sets said correction value based on the temperature change amount between said first control cycle and said second control cycle, and the temperature change amount between said second control cycle and a third control cycle preceding said second control cycle.

13. The control device according to claim 12, wherein when said temperature change trend between said first control cycle and said second control cycle and said temperature change trend between said second control cycle and said third control cycle are different from each other, and when the temperature change amount between said first cycle and said second cycle is less than the temperature change amount between the second control cycle and the third control cycle, said setting portion sets said correction value to zero.

14. A non-transitory computer-readable storage medium storing a program executable by an information processing device installed in a control device configured to control a solder processing device, said solder processing device having a solder processing portion which processes solder, a heating portion which heats said solder processing portion by applying heat pulses, and a detecting member which detects the temperature of said solder processing portion, said program comprising instructions that, when executed by the information processing device, cause the control device to function as:

an acquiring means which acquires a detection value of said temperature detected by said detecting member;

a specifying means which specifies a temperature change trend of said solder processing portion based on history information of said detection value acquired by said acquiring means;

a setting means which sets a number of heat pulse applied to said heating portion by correcting a reference value using a correction value; and a control means which controls the application of said heat pulses to said heating portion based on a setting result of said number of heat pulse set by said setting means, wherein said setting means sets said correction value using correction information which is different according to whether said temperature change trend is a temperature rising trend or a temperature declining trend.

15. A control method of a solder processing device having a solder processing portion which processes solder, a heating portion which heats said solder processing portion by applying heat pulses, and a detecting member which detects the temperature of said solder processing portion, the control method comprising:

acquiring a detection value of said temperature detected by said detecting member;

specifying a temperature change trend of said solder processing portion based on history information of said detection value acquired;

setting a number of said heat pulse to be applied to said heating portion by correcting a reference value using a correction value; and controlling the application of said heat pulses to said heating portion based on a setting result of said number of heat pulse, wherein in setting of said number of heat pulse, said correction value is set using correction information which is different according to whether said temperature change trend is a temperature rising trend or a temperature declining trend.

* * * * *